(12) United States Patent
Lee et al.

(10) Patent No.: US 11,662,048 B2
(45) Date of Patent: May 30, 2023

(54) COMPACT DUCT SOUND ABSORBER

(71) Applicant: Toyota Motor Engineering & Manufacturing North America, Inc., Plano, TX (US)

(72) Inventors: Taehwa Lee, Ann Arbor, MI (US); Hideo Iizuka, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 452 days.

(21) Appl. No.: 16/833,909

(22) Filed: Mar. 30, 2020

(65) Prior Publication Data

US 2021/0301965 A1    Sep. 30, 2021

(51) Int. Cl.
| | | |
|---|---|---|
| *F16L 55/033* | (2006.01) | |
| *F24F 13/24* | (2006.01) | |
| *G10K 11/162* | (2006.01) | |
| *G10K 11/172* | (2006.01) | |

(52) U.S. Cl.
CPC .......... *F16L 55/0335* (2013.01); *F24F 13/24* (2013.01); *G10K 11/162* (2013.01); *G10K 11/172* (2013.01); *F24F 2013/245* (2013.01)

(58) Field of Classification Search
CPC ..... G10K 11/162; G10K 11/172; F24F 13/24; F16L 55/0335
USPC ....................................................... 181/224
See application file for complete search history.

(56) References Cited

U.S. PATENT DOCUMENTS

| | | | |
|---|---|---|---|
| 4,645,032 A | * | 2/1987 | Ross .......................... F02C 7/24 181/224 |
| 5,445,861 A | | 8/1995 | Newton et al. |
| 6,290,022 B1 | | 9/2001 | Wolf et al. |
| 7,934,581 B2 | * | 5/2011 | Kim ................... F02M 35/1216 123/184.55 |
| 8,820,477 B1 | | 9/2014 | Herrera et al. |
| 9,625,077 B2 | * | 4/2017 | Barbolini .............. F16L 55/033 |
| 10,386,065 B2 | * | 8/2019 | Liu ........................... F02C 7/24 |
| 10,546,070 B2 | * | 1/2020 | Hellat ..................... G06F 30/00 |

(Continued)

FOREIGN PATENT DOCUMENTS

| | | | | |
|---|---|---|---|---|
| DE | 10316628 A1 | * | 10/2004 | ............. F01N 1/003 |
| WO | 2016102691 A2 | | 6/2016 | |

OTHER PUBLICATIONS

Selamet, A. et al., "Helmholtz resonator lined with absorbing material," J. Acoust. Soc. Am. 117 (2), Feb. 2005, pp. 725-733.

(Continued)

*Primary Examiner* — Forrest M Phillips
(74) *Attorney, Agent, or Firm* — Christopher G. Darrow; Darrow Mustafa PC (57) ABSTRACT

Compact sound attenuation systems for fluid ducts are provided having one or more sound attenuation units that can be absorptive or reflective, depending on design. Each sound attenuation unit has one or more encircling Helmholtz resonators that fully encircle the duct in a lateral direction. Sound attenuation units can be coincident with the duct well and either interior or exterior to the duct, or in some instances can be partly interior and partly exterior to the duct. Sound attenuation systems can be tuned for maximum attenuation of a single resonance frequency, or can include multiple units of different frequencies for broadband attenuation.

20 Claims, 9 Drawing Sheets

(56) References Cited

U.S. PATENT DOCUMENTS

| | | | |
|---|---|---|---|
| 10,900,449 B2* | 1/2021 | Shin | F02M 35/1261 |
| 11,043,199 B2* | 6/2021 | Lee | G10K 11/172 |
| 11,114,080 B2 | 9/2021 | Lee et al. | |
| 11,156,150 B2* | 10/2021 | Kimura | F02B 27/0215 |
| 11,322,126 B2* | 5/2022 | Lee | G10K 11/162 |
| 2003/0006090 A1 | 1/2003 | Reed | |
| 2006/0257621 A1 | 11/2006 | Kuriyama | |
| 2012/0240486 A1 | 9/2012 | Borroni | |
| 2014/0190764 A1* | 7/2014 | Matsumoto | F02M 35/1272 181/226 |
| 2015/0122577 A1 | 5/2015 | Zalewski et al. | |
| 2016/0017810 A1 | 1/2016 | Lord et al. | |
| 2016/0027427 A1 | 1/2016 | Yang et al. | |
| 2016/0078857 A1 | 3/2016 | Sheng et al. | |
| 2017/0053635 A1 | 2/2017 | Leon et al. | |
| 2017/0089238 A1 | 3/2017 | Leyko et al. | |
| 2018/0051462 A1 | 2/2018 | Hakuta et al. | |

OTHER PUBLICATIONS

Wang, X. et al., "Wave propagation in a duct with a periodic Helmholtz resonators array," J. Acoust. Soc. Am. 131 (2), Feb. 2012, pp. 1172-1182.

Ghaffarivardavagh, R. et al., "Ultra-open acoustic metamaterial silencer based on Fano-like interference," Physical Review B 99, (2019), pp. 024302-2-024302-10.

Ma, G. et al., "Acoustic metasurface with hybrid resonances," Nature Materials (2014), pp. 1-6.

Huang, T., "Vibration of Thin Plates under Acoustic Excitations: its Application in Acoustic Metamaterials," North Carolina State University (2017), 115 pages.

Merkel et al., "Control of acoustic absorption in one-dimensional scattering by resonant scatterers", Applied Physics Letters 107, 244102 (2015) (5 pages).

* cited by examiner

COMPACT DUCT SOUND ABSORBER

TECHNICAL FIELD

The present disclosure generally relates to acoustic resonators for sound attenuation and, more particularly, to compact resonators for sound attenuation in fluid ducts.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Duct systems are widely used in a variety of applications for transporting fluids—such as air, other gases, or liquids. Movement of fluid through ducts, as well as the operation of pumps or fans, inevitably causes unwanted sound to propagate along ducts as well. Conventional approaches for noise reduction in ducts can include layers of porous sound insulation substances, the use of quieter fluid flow drives, or resonant sound absorbers.

Resonant sound absorbers often have space consuming cavities, and therefore their use is often precluded in tight spaces. Furthermore, insertion of a typical resonant sound absorber inside of a duct is usually unfeasible, as the bulk of the absorber would unacceptably restrict fluid flow.

Accordingly, it would be desirable to provide resonant sound attenuation structures for ducts that are sufficiently compact so as to add minimal bulk either inside or outside the duct.

SUMMARY

This section provides a general summary of the disclosure, and is not a comprehensive disclosure of its full scope or all of its features.

In various aspects, the present teachings provide a fluid duct sound attenuation system. The system includes a duct having at least one duct wall defining a duct interior, for directing flow of a fluid and having a longitudinal axis defining upstream and downstream directions. The system further includes a sound attenuation unit having at least one internal Helmholtz resonator. The at least one internal Helmholtz resonator is contained within the duct interior and has a chamber portion bounded by at least two perimeter walls defining a chamber volume. The at least two perimeter walls include an outer perimeter wall and an inner perimeter wall, the outer perimeter wall being coincident with an interior of the at least one duct wall. The at least one internal Helmholtz resonator also includes an aperture in the inner perimeter wall defining a neck, the neck placing the chamber portion in fluid communication with the duct interior.

In other aspects, the present teachings provide a fluid duct sound attenuation system. The system includes a duct having at least one duct wall defining a duct interior, for directing flow of a fluid and having a longitudinal axis defining upstream and downstream directions. The system also includes a sound attenuation unit having at least one external Helmholtz resonator, located around the exterior of the duct. The at least one external Helmholtz resonator has a chamber portion bounded by at least two perimeter walls defining a chamber volume, the at least two perimeter walls including an outer perimeter wall and an inner perimeter wall. The inner perimeter wall is coincident with the exterior of the at least one duct wall such that the at least one external Helmholtz resonator laterally encircles the duct. The at least one external Helmholtz resonator also includes an aperture in the inner perimeter wall placing the chamber portion in fluid communication with the duct interior.

In still other aspects, the present teachings provide a sound attenuation unit for insertion into a fluid duct. The sound attenuation unit includes at least one annular Helmholtz resonator having at least two perimeter walls defining a chamber volume. The at least two perimeter walls include an annular outer perimeter wall configured to fit against the inner surface of a duct wall, the annular outer perimeter wall defining a first radius. The at least two perimeter walls also include an annular inner perimeter wall defining a second radius, smaller than the first radius. The at least one Helmholtz resonator also includes an annular aperture in the annular inner perimeter wall, placing the chamber volume in fluid communication with an ambient environment.

Further areas of applicability and various methods of enhancing the disclosed technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide sound absorption systems to eliminate noise from fluid ducts. The disclosed sound absorption systems can be broadly configured and tuned for different duct types, geometries, and sound frequency ranges.

The sound absorption systems of the present teachings include coupled pairs of Helmholtz resonators attached to, and in fluid communication with, a fluid duct. The configuration of the systems generates broad spectrum sound absorption by providing a resonance frequency difference between the coupled pairs, and an acoustic loss difference between the coupled, individual resonators within each pair.

Figure 1A:
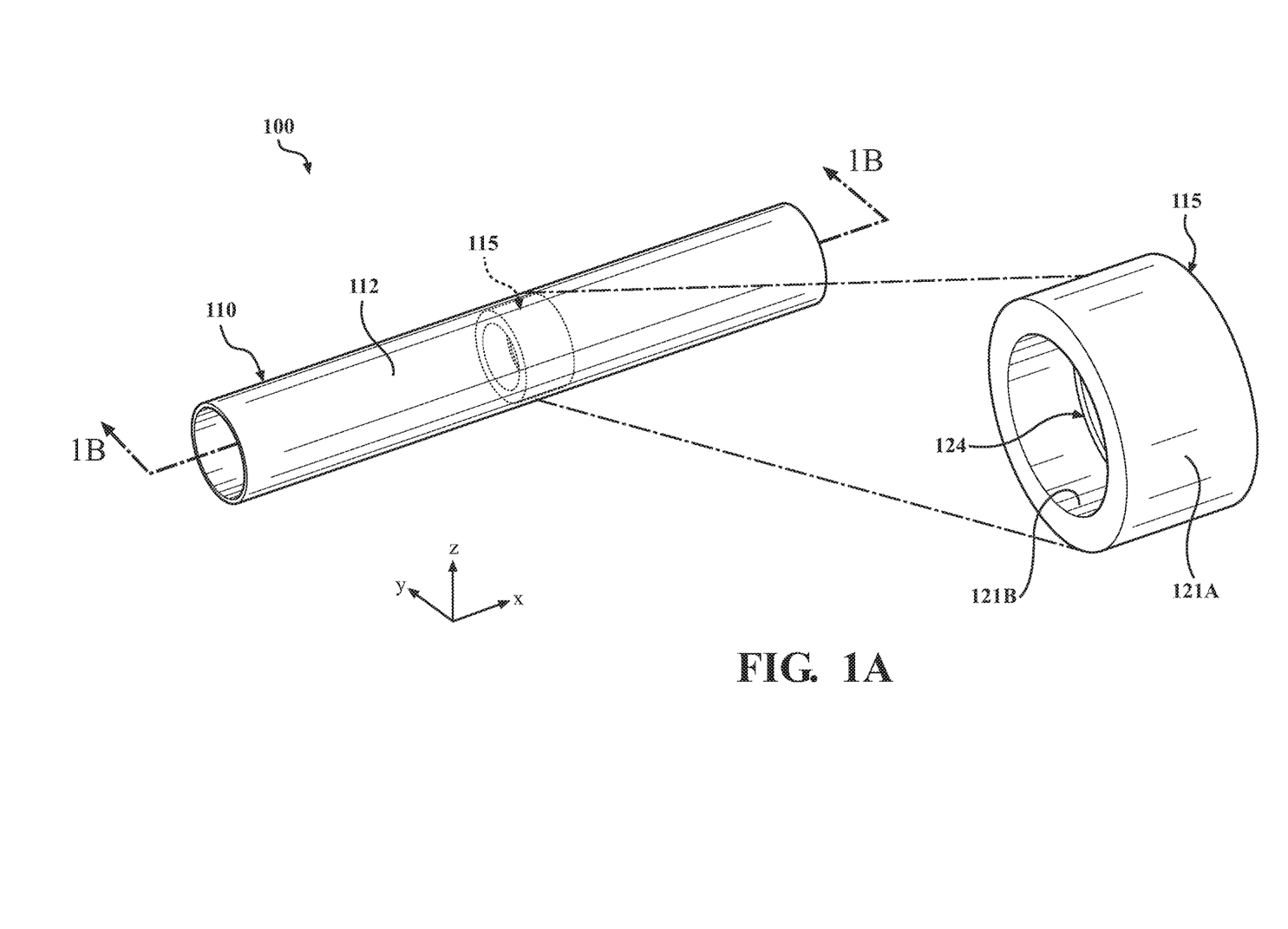
FIG. 1A is a perspective view of a fluid duct having a compact sound attenuation system of the present teachings, with a magnified view of an annular resonator of the attenuation system.
Figure 1B:
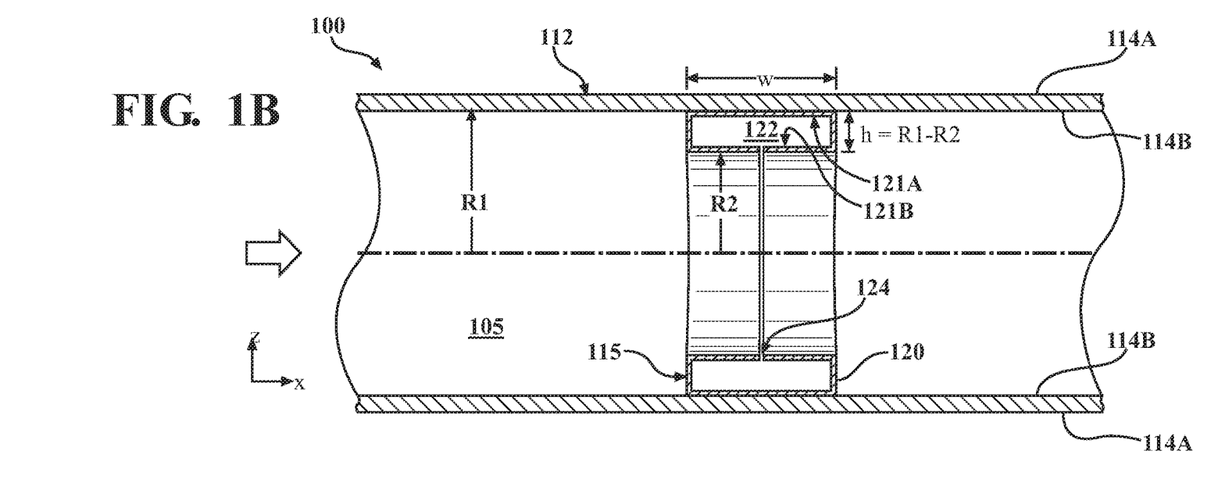
FIG. 1B is a side cross-sectional view of duct of FIG. 1A, viewed along the line 1B-1B from FIG. 1A.

FIG. 1A shows a perspective view of sound attenuation system 100 of the present teachings having a fluid duct 110 with one or more sound attenuation units 115. FIG. 1A includes a magnified view of an exemplary sound attenuation unit 115 of the system 100. FIG. 1B shows a side cross-sectional view of the fluid duct 110 of FIG. 1A, viewed along the line 1B-1B. The fluid duct 110 is formed of at least one duct wall 112. The exemplary fluid duct 110 of FIG. 1A can be integrated into any system 100 for directed flow of a fluid. In different manifestations, the fluid duct 110 can be configured to direct flow of air or other gas, such as in an HVAC system in a building or a motor vehicle; or can be configured to direct flow of a liquid, such as in a water main or a hydraulic fluid line. As such, the at least one duct wall 112 can be composed of any suitable material, including a metal or a plastic.

A direction of fluid flow is indicated by the block arrows labeled "F", so that the direction of fluid flow is from left-to-right in the view of FIG. 1B. The direction of fluid flow defines relative "upstream" and "downstream" positions in the fluid duct 110 such that, given the direction of fluid flow shown in FIG. 1B, a position nearer to the left end of the fluid duct 110 is upstream of a position nearer to the right end of the fluid duct 110; and a position nearer to the right end of the fluid duct 110 is downstream of a position nearer to the left end of the fluid duct 110, according to the representation of FIG. 1B. If the direction of fluid flow were reversed, the designations of upstream and downstream would similarly be reversed. The fluid duct 110 can, at any point, be considered to have a longitudinal axis coincident with the direction of fluid flow, F.

As shown in FIG. 1B, the exemplary sound attenuation unit 115 of FIGS. 1A and 1B is formed of a single encircling Helmholtz resonator 120. As used herein, the term "encircling" means that the encircling Helmholtz resonator 120 wraps internally or externally encircles the fluid duct 110 in a lateral direction. It is also to be understood that an encircling Helmholtz resonator 120 of the present teachings need not necessarily be circular, or annular, as in the example of FIGS. 1A and 1B, but can have an oval profile, a rectangular profile, or other profile as suitable to the cross-sectional shape of the fluid duct 110. In various implementations, a sound attenuation unit 115 can include one encircling Helmholtz resonator 120, or more than one encircling Helmholtz resonator 120. To recapitulate, a sound attenuation system 100 of the present teachings can include one, or more than one, sound attenuation unit 115; and individual sound attenuation units 115 can include one, or more than one, encircling Helmholtz resonator 120.

The sound attenuation unit 115 is configured to attenuate, by acoustic reflection and/or absorption, sounds resulting from the flow of fluid. The exemplary sound attenuation unit 115 of FIGS. 1A and 1B consists of a single encircling Helmholtz resonator 120, and has outer dimensions defined by: an outer radius, R1; an inner radius, R2; a height, h (equal to R1−R2); and a width, w.

The single encircling Helmholtz resonator 120 of FIGS. 1A-1B is a hollow ring having an outer perimeter wall 121A and an inner perimeter wall 121B forming side walls around an internal chamber 122 having an internal chamber volume, V. The encircling Helmholtz resonator 120 further has a slit 124, positioned on the inner perimeter wall 121B of the resonator 120 that places the internal chamber 122 in fluid communication with the duct interior 105.

Figure 1C:
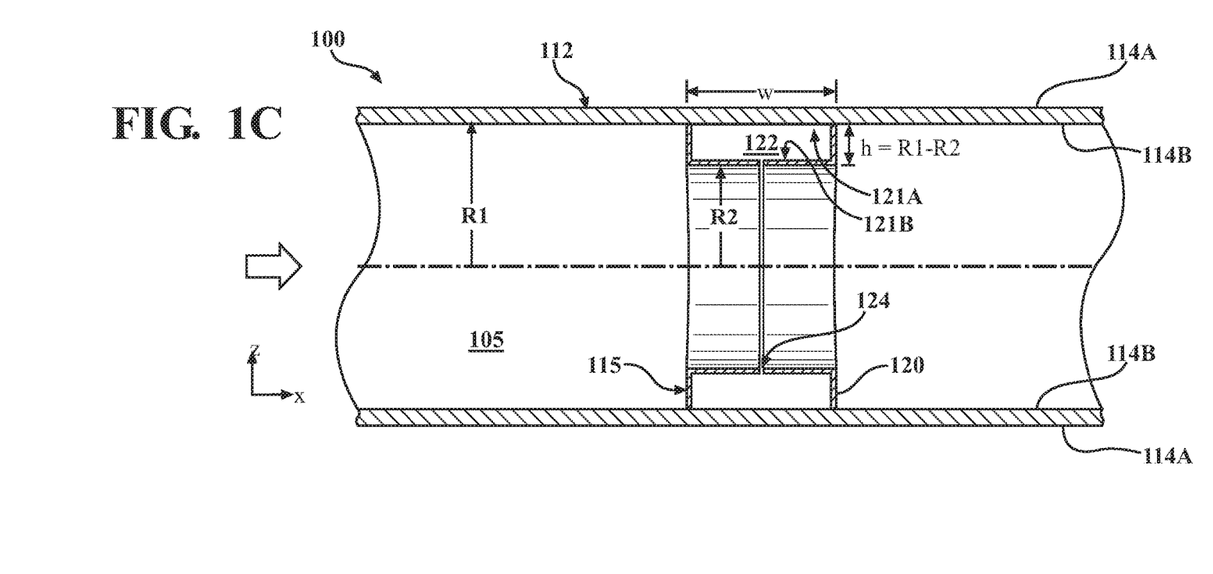
FIGS. 1C-1E are side cross-sectional views of variations of the duct of FIG. 1B, viewed from the same perspective as in FIG. 1B.
Figure 1D:
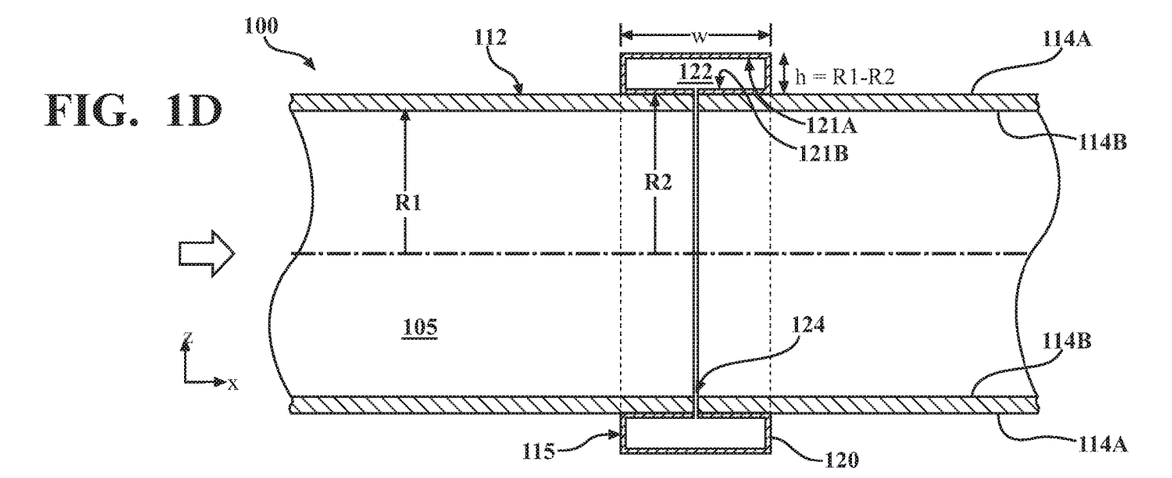
Figure 1E:
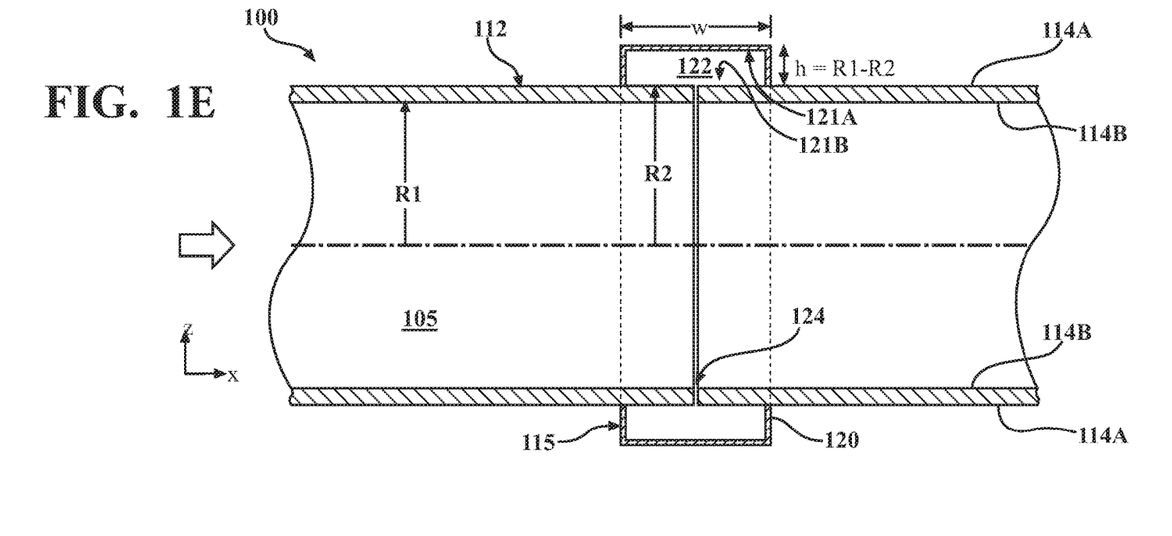

FIGS. 1C-1E show side cross sectional views, viewed from the same perspective as in FIG. 1B, of some variations of a sound attenuation system of the present teachings. In the variation of FIG. 1C, the internal chamber 122 is directly bounded by the inner surface 114B of the duct wall 112, so that the duct wall 112 forms the outer perimeter wall 121A of the sound attenuation unit 115. FIGS. 1D and 1E show side cross-sectional views of sound attenuation systems 100 of the present teachings in which the sound attenuation unit 115 is located outside the fluid duct 110. In the example of FIG. 1D, the inner perimeter wall 121B of the sound attenuation unit 115 is positioned adjacent to the outer surface 114A of the duct wall. In the example of FIG. 1E, the duct wall outer surface 114A directly bounds the internal chamber 122, and thus the duct wall outer surface 114A defines the inner perimeter wall 121B. Sound attenuation units 115 arranged as in FIG. 1A-1B or 1 can be referred to hereinafter as internal sound attenuation units—as they are located inside the duct 110, whereas sound attenuation units arranged as in FIG. 1D or 1E can be referred to hereinafter as external sound attenuation units—as they are located outside the duct 110. It will be understood that in the case of external sound attenuation units, the duct wall 112 has an aperture forming at least a part of the neck 124. In the example of FIG. 1E, the aperture in the duct wall 112 defines the neck 124, whereas in the example of FIG. 1D, the aperture in the duct wall 112 overlaps and combines with a corresponding aperture in the inner perimeter wall 121B of the sound attenuation unit 115 to form the neck 124.

Figure 2:
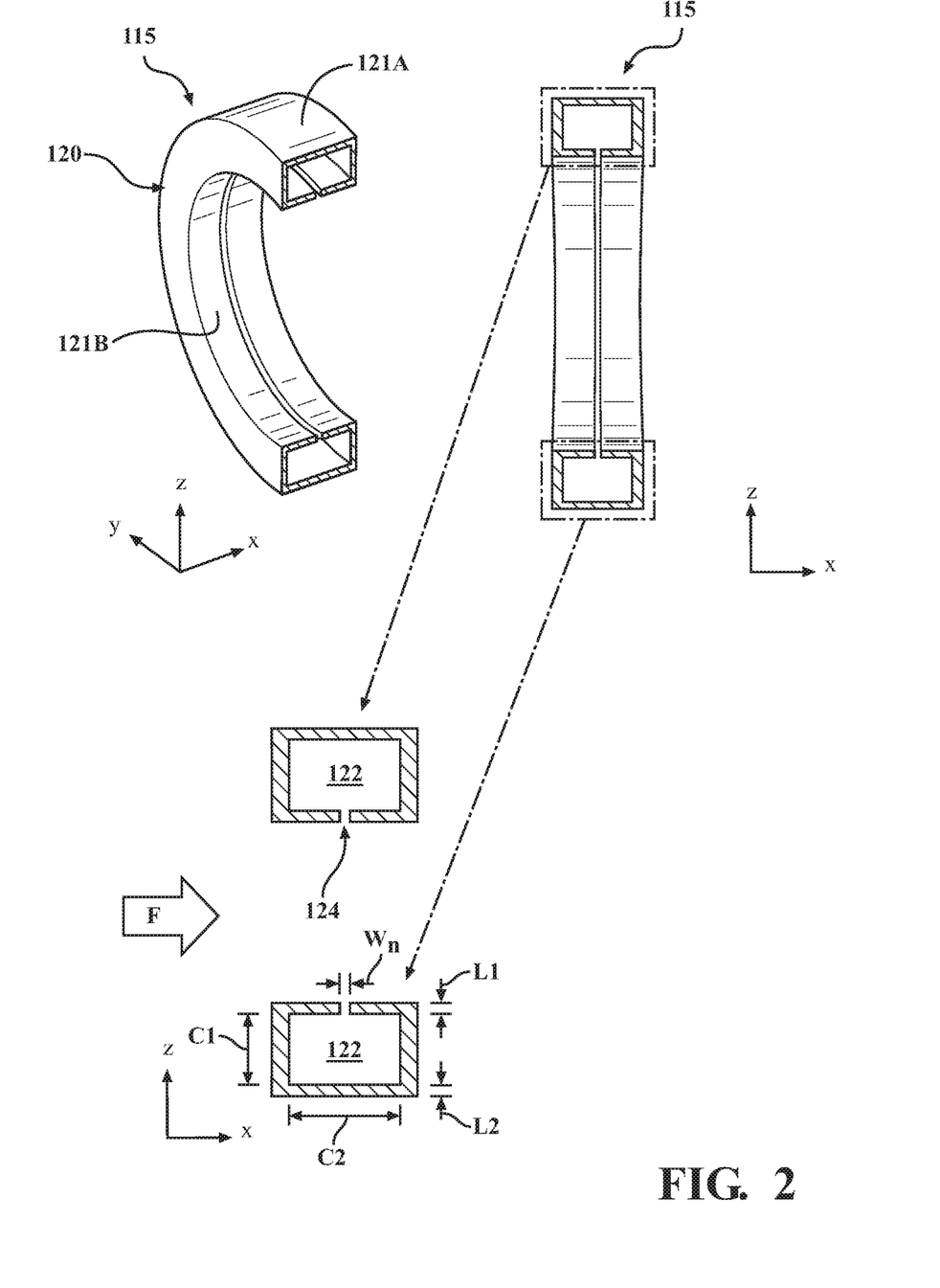
FIG. 2 is a perspective cross-sectional view and a side cross-sectional view of a reflective sound attenuation unit of the compact sound attenuation system, a single annular Helmholtz resonator.

FIG. 2 shows a perspective cross sectional view and side cross sectional view of a sound attenuation unit 115 such as in FIGS. 1A-1E, but with the fluid duct 110 removed for clarity. FIG. 2 further includes magnified portions of the side cross sectional view, shown in the lower section of the drawing. As illustrated in the lower portion of FIG. 2, the slit 124 (alternatively referred to as a "neck") is characterized by a width, $w_n$, and a length, L (corresponding to thickness of the inner perimeter wall). The internal chamber 122 is characterized by a height, c1, and a width, c2. In the example of FIGS. 1A-1C, the internal volume is approximately defined according to Equation 1:

$$V \approx \pi(R1-L2)^2 c2 - \pi(R1-L2-c1)^2 c2 \qquad 1.$$

where L2 is the thickness of the outer perimeter wall 121A. It will be understood that Equation 1 holds where the outer perimeter wall 121A sits against the duct wall 112, as in the examples of FIGS. 1A-1C. If the duct wall 112 serves as the outer perimeter wall 121A, as in the example of FIG. 1C, L2 is zero.

While Equation 1 gives the approximate volume of a circular, or annular, encircling Helmholtz resonator 120, it will be apparent that internal chamber volume of resonators 120 of other shapes will be described by different formulae.

The encircling Helmholtz resonator 120 then has a resonance frequency determined by Equation 2:

$$f = \frac{c}{2\pi}\sqrt{\frac{A}{VL}}.\qquad 2$$

where f is the resonance frequency of the Helmholtz resonator; c is the speed of sound in the duct fluid; A is the cross-sectional area of the neck; V is the chamber volume; and L is the neck length.

It will be understood that when sound is present in the fluid duct 110, at or near the resonance frequency of the encircling Helmholtz resonator 120, this will cause the resonator 120 to resonate at said frequency. This, in turn, will lead to attenuation of the incident sound. Such sound can be present due to vibrations in the duct, the activity of an upstream fan or pump, or other factors. As discussed in detail below, while the exemplary sound attenuation unit 115 of FIGS. 1A-1C function primarily by reflecting incident sound, other variations can operate primarily by absorbing incident sound.

Figure 3:
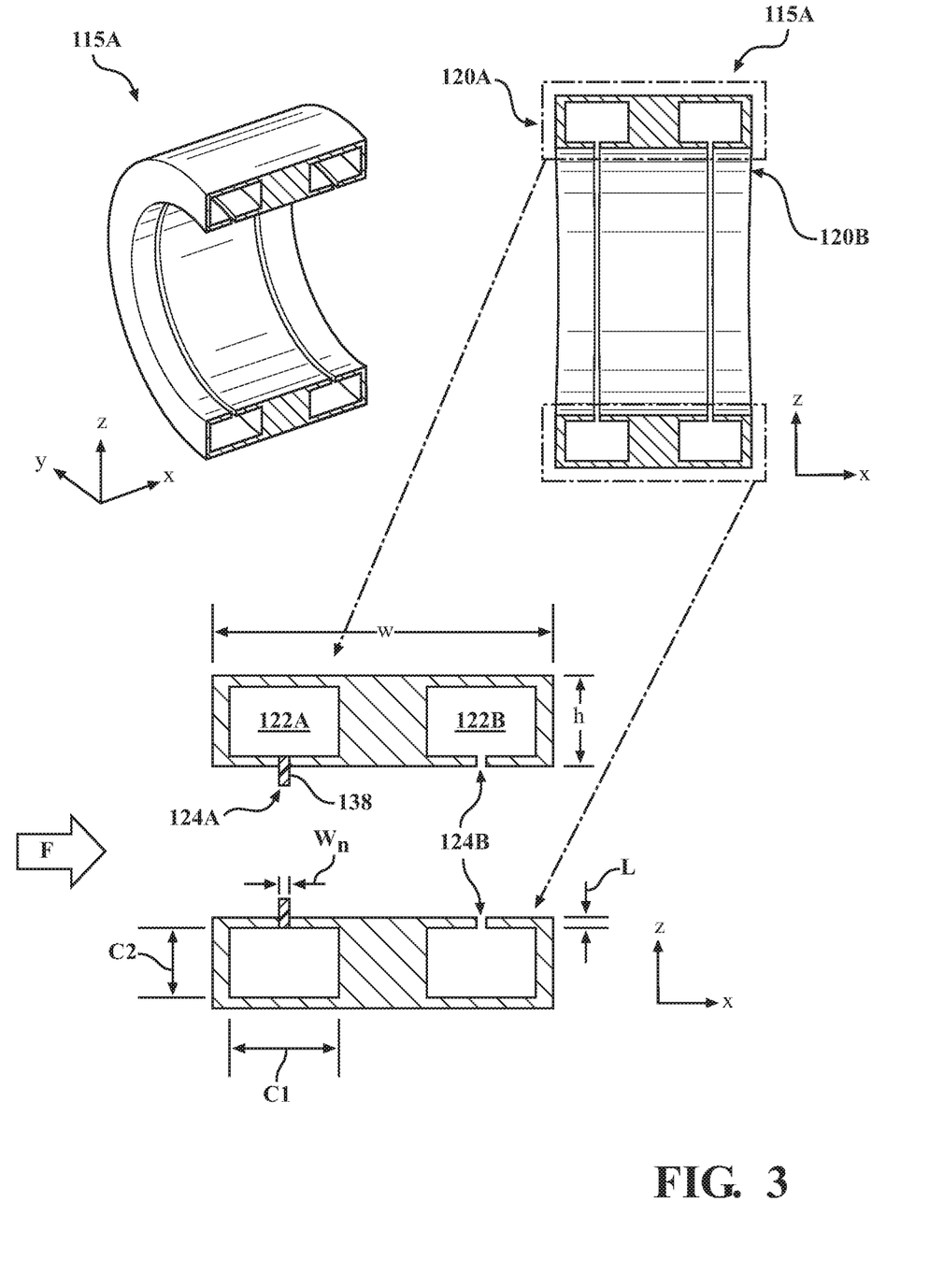
FIG. 3 is a perspective cross-sectional view and a side cross-sectional view of an absorptive sound attenuation unit of the compact sound attenuation system, having a coupled pair of annular Helmholtz resonators.

FIG. 3 shows identical views to those of FIG. 2, but for an absorption type sound attenuation unit 115. FIG. 3 shows a perspective cross sectional view and side cross sectional view of the absorption type sound attenuation unit 115, with magnified portions of the side cross sectional view shown in the lower section of the drawing. The absorption type sound attenuation unit 115 of FIG. 3 includes a pair of coupled Helmholtz resonators: an upstream encircling Helmholtz resonator 120A and a downstream encircling Helmholtz resonator 120B. The upstream and downstream resonators 120A, 12B generally have identical dimensions, including dimensions of the slits 124A, 124B and dimensions defining the internal chamber volumes 122A, 122B, as described above. The upstream and downstream resonators 120A, 120B thus have identical resonance frequencies.

The slit 124A of the upstream resonator 120A in the absorption type sound attenuation unit 115 is partially or completely filled with a "lossy" porous material 138 that attenuates sound through viscous loss and thereby causes the upstream resonator 120A in absorption mode sound attenuation unit 115A to have greater acoustic loss than the downstream resonator 120B. The upstream Helmholtz resonator 120A can thus alternatively be referred to as the "high loss resonator" 120A within the absorption type sound attenuation unit 115A. In many implementations, the porous material 138 can be a viscoelastic foam, such as a melamine foam or polyurethane foam. It will generally be desirable that the slits 124A, 124B of the upstream and downstream Helmholtz resonators 120A, 120B are separated by a distance equal to about one-quarter of the resonance wavelength, λ, corresponding to the resonance frequency, f, of the two resonators 120A, 120B. It will of course be understood that the resonance wavelength corresponds to the resonance frequency via λ=c/f.

It will be understood that, through resonance, the upstream, high loss resonator 120A collects incident sound, and the porous material 138 dissipates the collected sound through conventional viscoelastic dissipation. The downstream resonator 120B reflects sound back to the upstream resonator 120A, so that the upstream resonator 120A has a "second chance" to dissipate any sound that it missed on the first pass. This results in high efficiency sound absorption/dissipation at the resonance frequency. In general, it will be desired that the upstream resonator 120A exhibit greater than about 50% acoustic loss at the resonance frequency. In some implementations, the upstream resonator 120A can exhibit up to 60% acoustic loss at the resonance frequency. In some implementations, it can be desirable that the downstream resonator 120B exhibit greater than about 90% acoustic reflection at the resonance frequency.

Figure 4A:
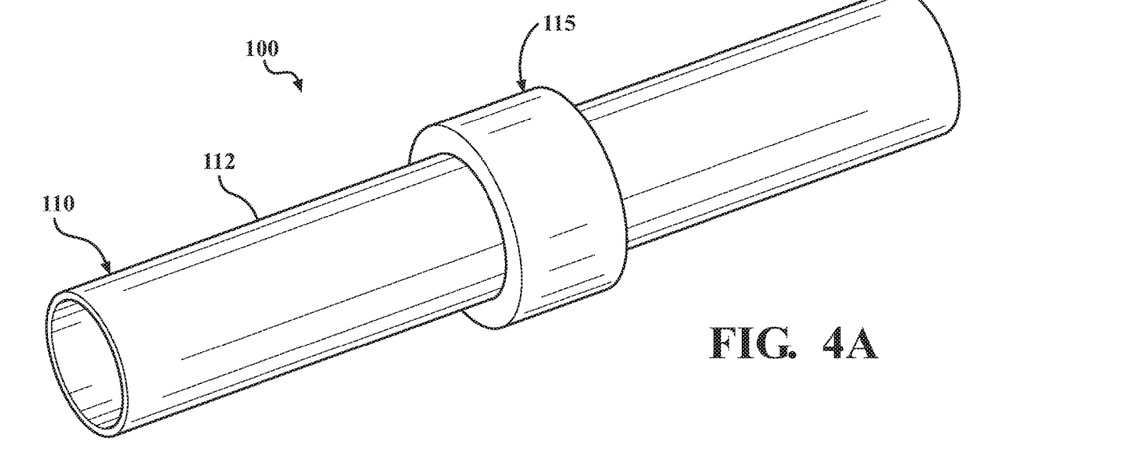
FIG. 4A is a perspective view of a variation of the compact sound attenuation system having an external sound attenuation unit.
Figure 4B:
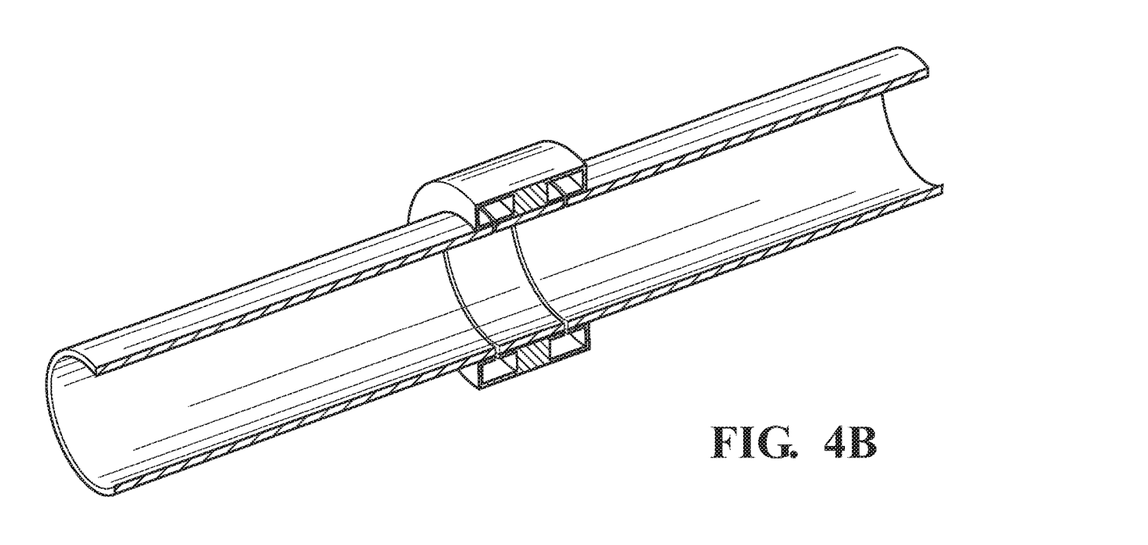
FIG. 4B is a perspective cross sectional view of the system of FIG. 4A.
Figure 4C:
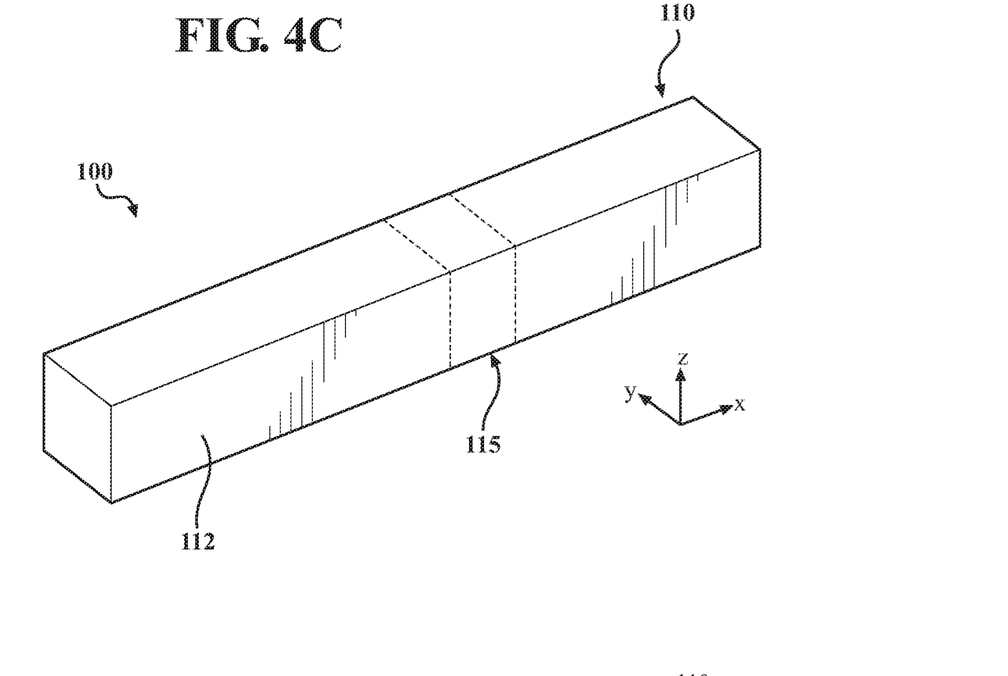
FIGS. 4C and 4D are perspective views of variations of the disclosed compact sound attenuation systems for ducts having a rectangular shape, with internal and protruding sound attenuation units, respectively.
Figure 4D:
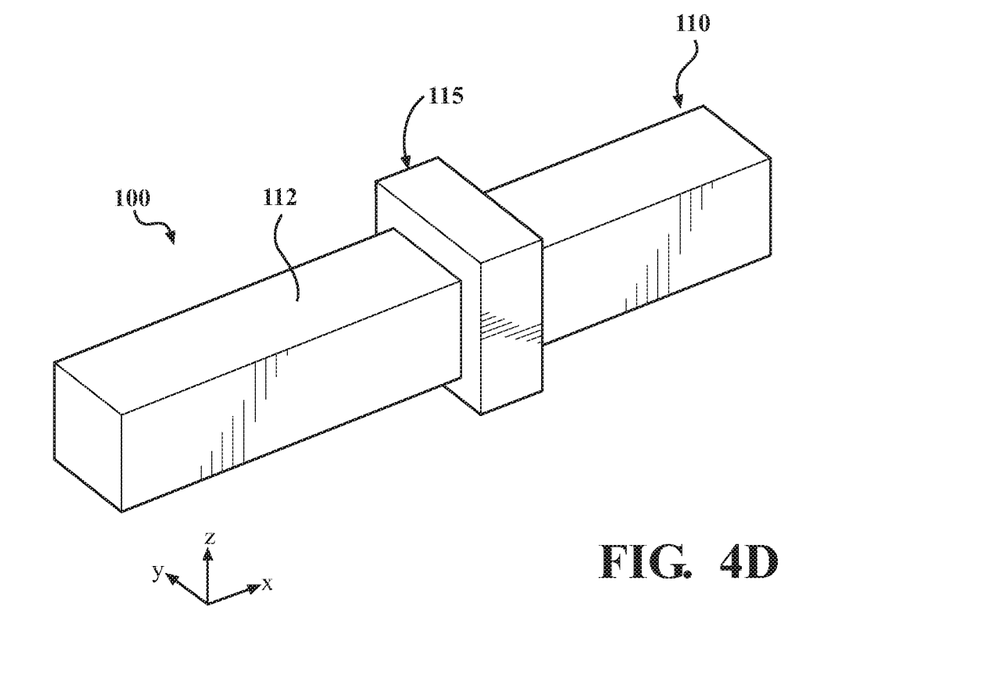

FIG. 4A shows a perspective view of a sound attenuation system 100 of the present teachings having an external sound attenuation unit 115, as described above, while FIG. 4B shows a cross-sectional perspective view of the system 100 of FIG. 4A, with the front portion removed to enable viewing the system 100 interior. FIGS. 4C and 4D show exemplary sound attenuation systems 100 having internal and external sound attenuation units 115 for a fluid duct 110 having a rectangular profile.

Figure 5:
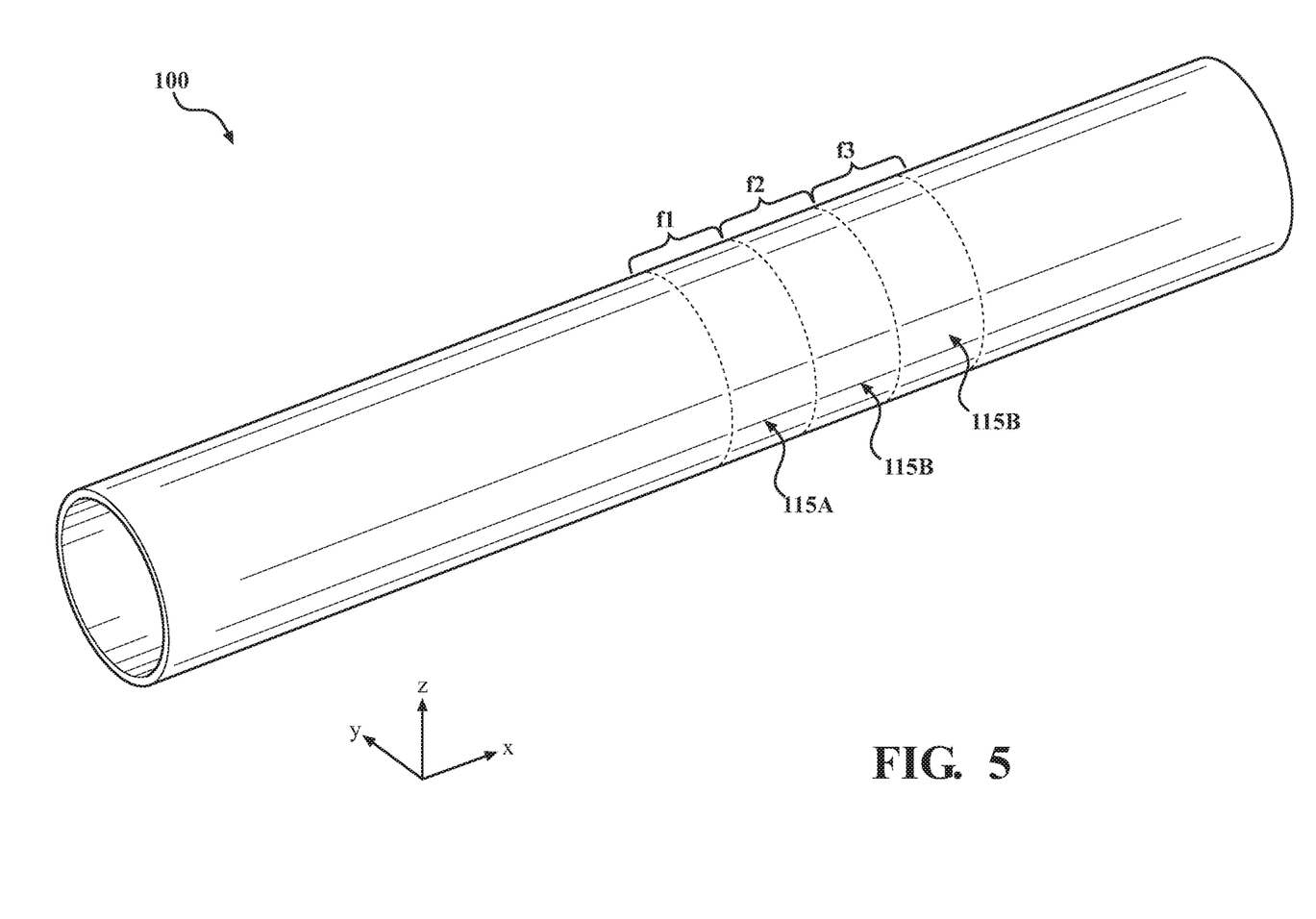
FIG. 5 is a perspective view of a fluid duct having a broadband compact sound attenuation system of the present teachings, with three sound attenuation units of differing frequency.

FIG. 5 is a perspective view of a fluid duct having a broadband compact sound attenuation system 100 of the present teachings, having three sound attenuation units 115A, 115B, and 115C, of differing frequency. With reference to Equation 2, above, it will be noted the differing frequencies can be produced by modifying the cross-sectional area of the neck, A; the chamber volume, V; the neck length, L, or any combination thereof. In general, a broadband compact sound attenuation system 100 for a fluid duct 110 can have two or more sound attenuation units 115, each having a different resonance frequency according to Equation 2. The individual sound attenuation units 115 making up a broadband sound attenuation system 100 can be of the absorptive or reflective types described above, but in most instances will all be of the same type, whether absorptive or reflective.

Figure 6A:
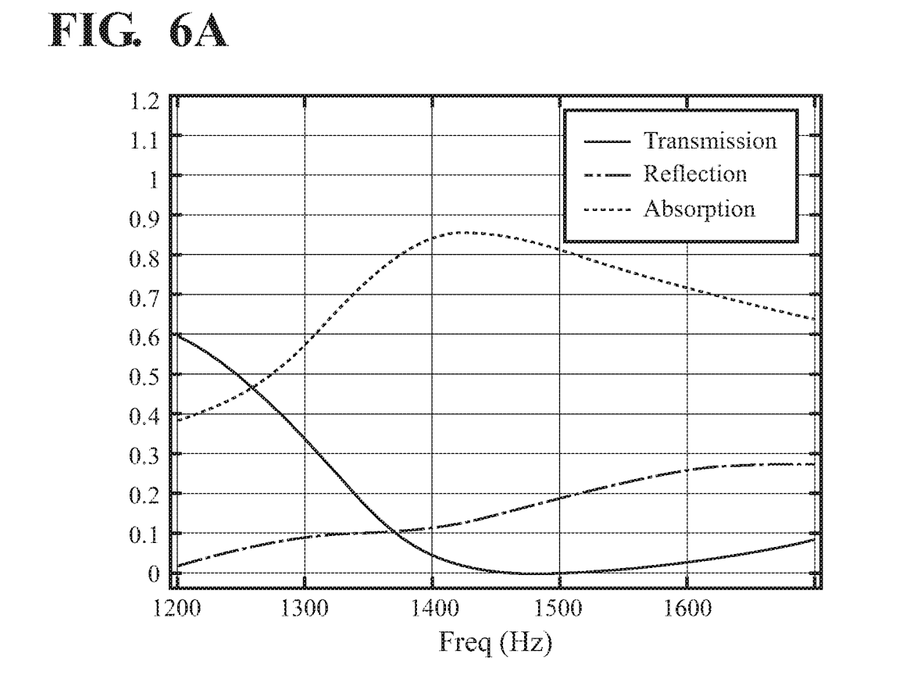
FIG. 6A is a graph of acoustic properties of a duct having the sound attenuation system of FIG. 2A.
Figure 6B:
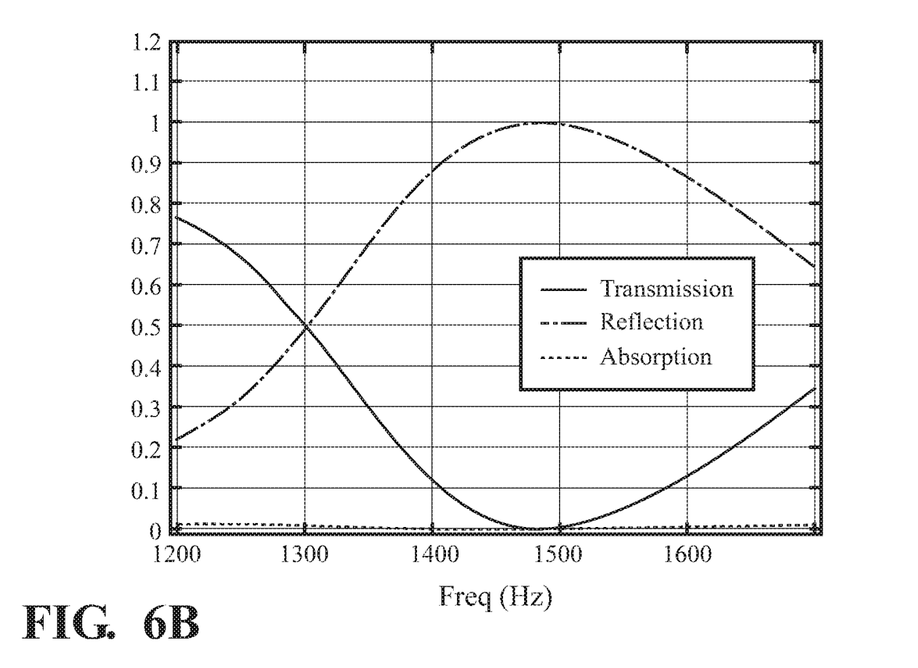
FIG. 6B is a graph of acoustic properties of a duct having the sound attenuation system of FIG. 2B.

FIG. 6A is a graph of acoustic properties of an exemplary absorption type sound attenuation system 100 of the type shown in FIG. 3. The geometric parameters are w=77 mm, h=20 mm, R1=70 mm (inner radius of the duct), c1=26 mm, c2=16 mm, L1=2 mm, and wn=2 mm, with upstream and downstream encircling Helmholtz resonators 120A, 120B being geometrically identical. As shown in FIG. 6A, the exemplary absorption type sound attenuation system 100 absorbs nearly 90% of incident sound near the resonance frequency of 1400 Hz, and exhibits zero transmission at about 1500 Hz. FIG. 6B is a graph of acoustic properties of an exemplary reflection type sound attenuation system 100 of the type shown in FIGS. 1A and 1B. The geometric parameters are of the individual encircling Helmholtz resonator as above (w=77 mm, h=20 mm, R1=70 mm (inner radius of the duct), c1=26 mm, c2=16 mm, L1=2 mm, and wn=2 mm.). As shown in FIG. 6B, the exemplary reflection type sound attenuation system 100 reflects essentially 100% of incident sound near at about 1480 to 1500 Hz.

In some instances, systems 100 of the present teachings can be utilized in an automotive vehicle. For example, the fluid duct 110 can be a duct for cooling the battery of an electric or hybrid vehicle; or the duct can be a vehicle duct in fluid communication with the vehicle cabin. In some instances, a sound attenuation unit 115 of the present teachings can be made as a standalone article, or aftermarket addition to a fluid duct 110. Such a standalone sound attenuation unit 115 would be most easily added as an internal sound attenuation unit; i.e. designed to fit into the interior of a specific fluid duct 110. Sound attenuation units 115 could be designed, for example, to fit into the ductwork of a line of automobile, or into a standard size of HVAC ductwork for building construction. It will be appreciated that, while external or internal/external sound attenuation units 115 could be designed for aftermarket addition, such addition would require modification of the duct wall 112.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system 100 is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A fluid duct sound attenuation system, comprising:
    a duct having at least one duct wall defining a duct interior, for directing flow of a fluid and having a longitudinal axis defining upstream and downstream directions; and
    a sound attenuation unit having at least one internal Helmholtz resonator, the at least one internal Helmholtz resonator contained within the duct interior, having:
        a chamber portion bounded by at least two perimeter walls defining a chamber volume, the at least two perimeter walls including an outer perimeter wall and an inner perimeter wall, the outer perimeter wall being coincident with an interior of the at least one duct wall; and
        an aperture in the inner perimeter wall defining a neck, the neck placing the chamber portion in fluid communication with the duct interior, the neck being a continuous slit within the inner perimeter.

2. The fluid duct sound attenuation system as recited in claim 1, wherein the at least one internal Helmholtz resonator has an intrinsic resonance frequency according to an equation:

$$f = \frac{c}{2\pi}\sqrt{\frac{A}{VL}}$$

wherein c is the speed of sound in the fluid, A is a neck surface area, L is a neck length, and V is the chamber volume.

3. The fluid duct sound attenuation system as recited in claim 1, wherein the sound attenuation unit comprises a pair of coupled Helmholtz resonators wherein the at least one internal Helmholtz resonator comprises a first internal Helmholtz resonator having a first chamber portion and a first aperture defining a first neck, first internal Helmholtz resonator having a first resonance frequency, and further comprising:
    a second internal Helmholtz resonator having a second chamber portion and a second aperture defining a second neck with geometry identical to that of the first internal Helmholtz resonator, and positioned upstream relative to the first internal Helmholtz resonator, having a second resonance frequency substantially identical to the first resonance frequency, and having a porous sound absorbing material partially or completely filling or covering the second neck.

4. The fluid duct sound attenuation system as recited in claim 3, wherein the first internal Helmholtz resonator exhibits greater than about 90% acoustic reflection, and the second internal Helmholtz resonator exhibits greater than about 50% acoustic loss.

5. The fluid duct sound attenuation system as recited in claim 3, wherein the first and second necks are separated by a distance equal to about one-quarter of a wavelength corresponding to the first and second resonance frequency.

6. The fluid duct sound attenuation system as recited in claim 1, having a plurality of sound attenuation units, each sound attenuation unit of the plurality comprising a coupled pair of Helmholtz resonators, and each sound attenuation unit of the plurality having a different resonance frequency, thereby broadening a sound absorption profile of the fluid duck sound attenuation system.

7. The fluid duct sound attenuation system as recited in claim 1, wherein the duct has a circular cross-sectional shape, and the sound attenuation unit has an annular shape.

8. The fluid duct sound attenuation system as recited in claim 1, wherein the duct is in fluid communication with a duct of a battery cooling system for an electric or hybrid electric vehicle.

9. The fluid duct sound attenuation system as recited in claim 1, wherein the outer perimeter wall comprises a portion of the duct wall.

10. The fluid duct sound attenuation system as recited in claim 1, wherein the outer perimeter wall rests against the duct wall.

11. A fluid duct sound attenuation system, comprising:
a duct having at least one duct wall defining a duct interior, for directing flow of a fluid and having a longitudinal axis defining upstream and downstream directions; and
a sound attenuation unit having at least one external Helmholtz resonator, located around an exterior of the duct, the at least one external Helmholtz resonator having:
a chamber portion bounded by at least two perimeter walls defining a chamber volume, the at least two perimeter walls including an outer perimeter wall and an inner perimeter wall, the inner perimeter wall being coincident with the exterior of the at least one duct wall such that the at least one external Helmholtz resonator laterally encircles the duct; and
an aperture in the inner perimeter wall placing the chamber portion in fluid communication with the duct interior, the aperture being a continuous slit within the inner perimeter.

12. The fluid duct sound attenuation system as recited in claim 11, wherein the at least one external Helmholtz resonator has an intrinsic resonance frequency according to an equation:

$$f = \frac{c}{2\pi}\sqrt{\frac{A}{VL}}$$

wherein c is the speed of sound in the fluid, A is a neck surface area, L is a neck length, and V is the chamber volume.

13. The fluid duct sound attenuation system as recited in claim 11, wherein the at least one external Helmholtz resonator comprises a first external Helmholtz resonator having a first resonance frequency, and further comprising:
a second external Helmholtz resonator having a second chamber portion and a second aperture defining a second neck with geometry identical to that of the first external Helmholtz resonator, and positioned upstream relative to the first external Helmholtz resonator, having a second resonance frequency substantially identical to the first resonance frequency, and having a porous sound absorbing material partially or completely filling or covering the second neck.

14. The fluid duct sound attenuation system as recited in claim 13, wherein the first external Helmholtz resonator exhibits greater than about 90% acoustic reflection, and the second external Helmholtz resonator exhibits greater than about 50% acoustic loss.

15. The fluid duct sound attenuation system as recited in claim 11, having a plurality of sound attenuation units, each sound attenuation unit of the plurality comprising a coupled pair of Helmholtz resonators, and each sound attenuation unit of the plurality having a different resonance frequency, thereby broadening a sound absorption profile of the fluid duck sound attenuation system.

16. The fluid duct sound attenuation system as recited in claim 11, wherein the duct has a circular cross-sectional shape, and the sound attenuation unit has an annular shape.

17. The fluid duct sound attenuation system as recited in claim 11, wherein the duct is in fluid communication with a duct of a battery cooling system for an electric or hybrid electric vehicle.

18. The fluid duct sound attenuation system as recited in claim 11, wherein the inner perimeter wall comprises a portion of the duct wall.

19. The fluid duct sound attenuation system as recited in claim 11, wherein the inner perimeter wall rests against the duct wall.

20. A fluid duct sound attenuation system comprising:
a fluid duct for transporting fluid and having a duct wall enclosing a duct interior;
at least one sound attenuation unit, comprising:
at least one encircling Helmholtz resonator, having:
a chamber fully encircling the fluid duct in a lateral direction and defining a chamber volume; and
a continuous slit placing the chamber in fluid communication with the fluid duct and having a surface area and a length of passage from the chamber to the duct interior; and
characterized by a resonance frequency according to an equation:

$$f = \frac{c}{2\pi}\sqrt{\frac{A}{VL}}$$

wherein c is the speed of sound in the fluid, A is the neck surface area, L is the neck length, and V is the chamber volume.

* * * * *

UNITED STATES PATENT AND TRADEMARK OFFICE
CERTIFICATE OF CORRECTION

PATENT NO. : 11,662,048 B2
APPLICATION NO. : 16/833909
DATED : May 30, 2023
INVENTOR(S) : Taehwa Lee et al.

Page 1 of 1

It is certified that error appears in the above-identified patent and that said Letters Patent is hereby corrected as shown below:

In the Specification

Column 5, Line 18: delete "Vis" and insert --V is--

In the Claims

Claim 6, Column 8, Line 67: delete "duck" and insert --duct--

Claim 15, Column 10, Line 17: delete "duck" and insert --duct--

Signed and Sealed this
Twenty-seventh Day of June, 2023

Katherine Kelly Vidal
*Director of the United States Patent and Trademark Office*